(12) United States Patent
Thom et al.

(10) Patent No.: US 12,115,502 B2
(45) Date of Patent: Oct. 15, 2024

(54) SERIAL ARRANGEMENT HAVING MULTIPLE PLIES OF ASYMMETRIC FILTER MEDIA, PRODUCTION METHOD, FILTRATION UNIT, USE OF THE ARRANGEMENT, AND CHARACTERIZATION METHOD

(71) Applicant: Sartorius Stedim Biotech GmbH, Göttingen (DE)

(72) Inventors: Volkmar Thom, Göttingen (DE); Jörg Hosch, Boffzen (DE); Benjamin Schneider, Göttingen (DE)

(73) Assignee: Sartorius Stedim Biotech GmbH, Göttingen (DE)

(*) Notice: Subject to any disclaimer, the term of this patent is extended or adjusted under 35 U.S.C. 154(b) by 806 days.

(21) Appl. No.: 17/052,692

(22) PCT Filed: Jun. 4, 2019

(86) PCT No.: PCT/EP2019/064479
§ 371 (c)(1),
(2) Date: Nov. 3, 2020

(87) PCT Pub. No.: WO2019/234018
PCT Pub. Date: Dec. 12, 2019

(65) Prior Publication Data
US 2021/0178335 A1  Jun. 17, 2021

(30) Foreign Application Priority Data
Jun. 7, 2018  (DE) .................... 10 2018 004 521.9

(51) Int. Cl.
*B01D 69/02* (2006.01)
*B01D 61/14* (2006.01)
(Continued)

(52) U.S. Cl.
CPC .......... *B01D 69/02* (2013.01); *B01D 61/147* (2013.01); *B01D 65/10* (2013.01);
(Continued)

(58) Field of Classification Search
CPC ...... B01D 69/02; B01D 61/147; B01D 65/10; B01D 67/0013; B01D 69/12;
(Continued)

(56) References Cited

U.S. PATENT DOCUMENTS

| 5,906,742 A | 5/1999 | Wang et al. |
| 7,140,496 B2 | 11/2006 | Nagoya et al. |

(Continued)

FOREIGN PATENT DOCUMENTS

| DE | 3525235 C1 | 11/1986 |
| DE | 60120207 T2 | 10/2006 |

(Continued)

OTHER PUBLICATIONS

Office Action for Japanese Patent Application No. 2020-567499, mailed Apr. 5, 2022 (w/English translation).
(Continued)

*Primary Examiner* — Pranav N Patel
(74) *Attorney, Agent, or Firm* — Klarquist Sparkman, LLP

(57) ABSTRACT

The present invention relates to a serial arrangement comprising n plies of asymmetric filter media, wherein n is at least two and the pore size of the n plies substantially continuously decreases in the thickness direction of the serial arrangement, to a production method for the serial arrangement, to a filtration unit comprising the serial arrangement, to the use of the serial arrangement, and to a method for characterizing the pores of a filter medium.

13 Claims, 9 Drawing Sheets

(51) Int. Cl.
*B01D 65/10* (2006.01)
*B01D 67/00* (2006.01)
*B01D 69/14* (2006.01)
*G01N 15/08* (2006.01)
*G01N 23/2251* (2018.01)

(52) U.S. Cl.
CPC ....... *B01D 67/0013* (2013.01); *G01N 15/088* (2013.01); *G01N 23/2251* (2013.01); *B01D 2325/022* (2013.01); *B01D 2325/04* (2013.01); *G01N 2223/07* (2013.01); *G01N 2223/401* (2013.01); *G01N 2223/418* (2013.01); *G01N 2223/507* (2013.01)

(58) Field of Classification Search
CPC .......... B01D 2325/022; B01D 2325/04; G01N 15/088; G01N 23/2251; G01N 2223/07; G01N 2223/401; G01N 2223/418; G01N 2223/507
See application file for complete search history.

(56) References Cited

U.S. PATENT DOCUMENTS

| | | |
|---|---|---|
| 8,925,737 B2 | 1/2015 | Ishizuka et al. |
| 2002/0175124 A1 | 11/2002 | Tkacik et al. |
| 2009/0061205 A1 | 3/2009 | Hokazono et al. |
| 2010/0320138 A1 | 12/2010 | Waller, Jr. et al. |
| 2012/0275658 A1 | 11/2012 | Hurley et al. |
| 2017/0340793 A1 | 11/2017 | Wolff et al. |

FOREIGN PATENT DOCUMENTS

| | | |
|---|---|---|
| EP | 0083489 A2 | 7/1983 |
| EP | 0586789 A2 | 3/1994 |
| EP | 0806475 A2 | 11/1997 |
| EP | 1118377 B1 | 5/2005 |
| EP | 2623187 A1 | 8/2013 |
| JP | 2000-083649 A | 3/2000 |
| JP | 2003-509189 A | 3/2003 |
| JP | 2009-061363 A | 3/2009 |
| JP | 2012-531531 A | 12/2012 |
| JP | 2014-000557 A | 1/2014 |
| JP | 2016138813 A | 8/2016 |

OTHER PUBLICATIONS

International Search Report and Written Opinion for PCT/EP2019/064479, mailed Jan. 8, 2020 (w/English translation of International Search Report).

Figure 5
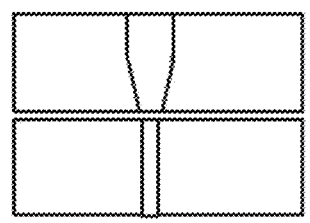
A
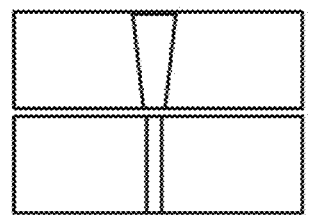
B
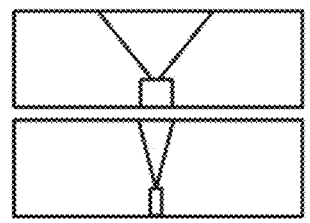
C
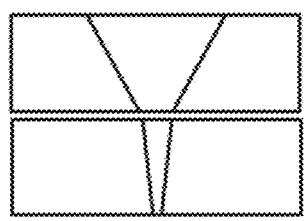
D
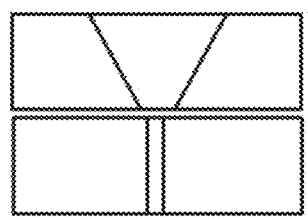
E
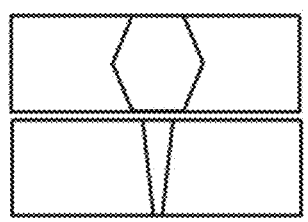
F

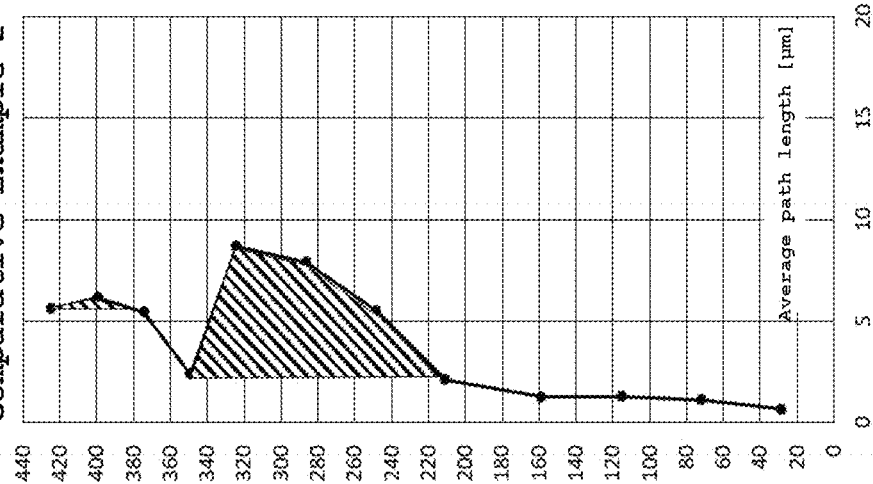
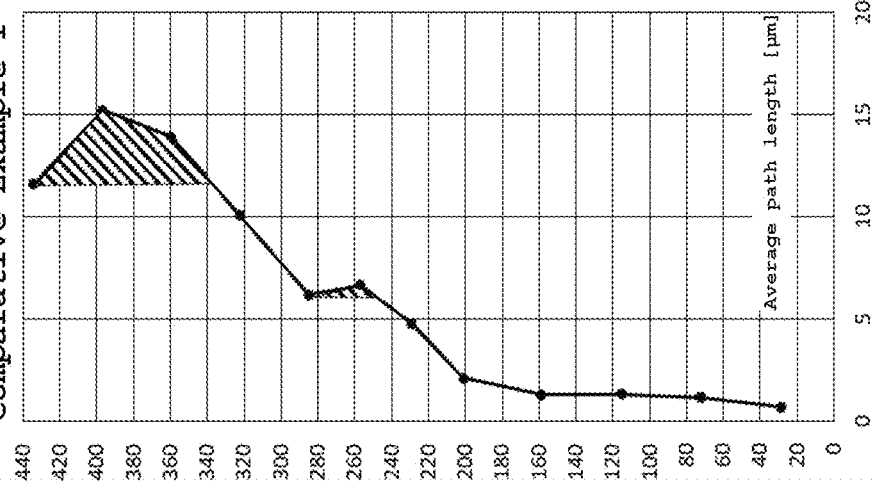
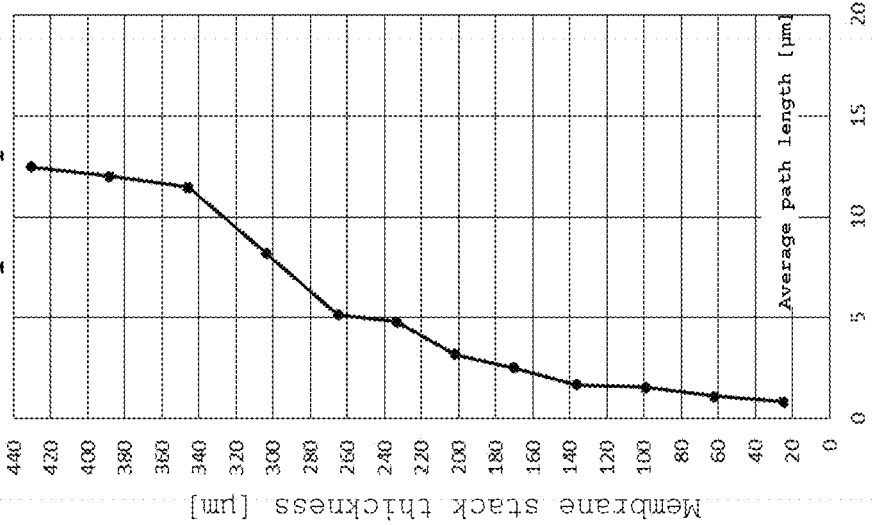
Figure 8

SERIAL ARRANGEMENT HAVING MULTIPLE PLIES OF ASYMMETRIC FILTER MEDIA, PRODUCTION METHOD, FILTRATION UNIT, USE OF THE ARRANGEMENT, AND CHARACTERIZATION METHOD

CROSS REFERENCE TO RELATED APPLICATIONS

This is the U.S. National Stage of International Application No. PCT/EP2019/064479, filed Jun. 4, 2019, which in turn claims the benefit of German Application No. 10 2018 004 521.9, filed Jun. 7, 2018, which application is incorporated herein in its entirety.

The present invention relates to a serial arrangement comprising n plies of asymmetric filter media, wherein n is at least two and the pore size of the n plies substantially continuously decreases in the thickness direction of the serial arrangement, to a production method for the serial arrangement, to a filtration unit comprising the serial arrangement, to the use of the serial arrangement, and to a method for characterizing the pores of a filter medium.

What are known from the prior art are production methods in which integral asymmetric membranes can be produced from two casting solutions having different compositions. They are usually referred to as cocasting methods. Therein, two or more polymer casting solutions having different compositions are substantially simultaneously brought together onto a moved support. As a result of a phase-inversion process, an integral membrane is then generated. The membrane obtained consists of multiple membrane layers firmly connected to one another, the number of membrane layers corresponding to the number of polymer casting solutions used. Using such methods, it is possible to produce integral asymmetric microfiltration membranes having different pore-size profiles. Although two or more casting solutions are used, the cocasting method yields an integral microfiltration membrane, i.e., a single membrane having membrane layers which are firmly connected to one another and which are respectively formed from the casting solution layers.

The general definition of membrane asymmetry is based on the ratio of the pore sizes of the opposite main surfaces of the membrane. Here, the pore sizes of the main surfaces are qualitatively ascertained from scanning electron microscopy images of the main surfaces. The pore-size profile between the main surfaces has, to date, been described only qualitatively owing to, inter alia, inadequate characterization methods. In the prior art, the pore-size profile of asymmetric microporous membranes is, for example, characterized by recording scanning electron microscopy images of membrane cross-sections. In this case, pore-size or porosity gradients are qualitatively assessed for example. The known methods also have little differentiating effect and cannot sufficiently describe relatively small differences between different membranes. Therefore, merely qualitative or semi-quantitative determination of pore-size or porosity gradients and hence only inadequate examining of influences of production conditions on pore-size or porosity gradients have been possible to date.

Besides cocasting membranes, multiple separate series-connected filter stages can also achieve a high service life. However, the series connection of filter media, the pore-size gradients of which are not optimally coordinated with one another, entails method-related disadvantages (e.g., a relatively high pressure loss and inadequate utilization of the filter volume) and therefore has a low efficiency.

DE 37 01 633 A1 discloses a microporous membrane, for example composed of polyethersulfone, having an asymmetric pore-size distribution along its membrane cross-section, the minimum of the pore sizes being passed in the membrane interior enclosed by the two main surfaces. The membrane produced by the precipitation bath method has a funnel-shaped or hourglass-shaped pore-size distribution along the membrane cross-section.

EP 1 118 377 B1 discloses a microporous polysulfone membrane produced by the precipitation bath method. The membrane has an isotropic region having a substantially constant pore size, which region extends from a point within the membrane cross-section toward the first main surface of the membrane. Said point within the membrane cross-section is situated at a distance of 15% to 50%, based on the total membrane thickness, from the first main surface of the membrane. Adjacent to the isotropic region, the membrane has an asymmetric region in which the pore size increases in the direction of the second main surface. The result is a funnel structure of the pore-size distribution.

U.S. Pat. No. 7,140,496 B2 discloses a membrane having a coarse-pored, asymmetric layer which includes the first main surface, is at least 5 μm thick and has a higher open-pore ratio than an adjoining fine-pored, isotropic and microporous layer. The fine-pored layer accounts for at least 50% of the total thickness of the membrane. The open-pore ratio of the coarse-pored layer continuously decreases proceeding from the first main surface in the direction of the fine-pored layer, the result being a funnel structure.

U.S. Pat. No. 5,906,742 discloses a microfiltration membrane consisting of polysulfone and a hydrophilic polymer and having a skin layer, an isotropic region of constant pore size and an adjoining anisotropic region having a pore size which gradually increases in the direction of the main surface bordering the anisotropic region, the result being a funnel structure.

EP 2 623 187 A1 discloses a microporous membrane having two main surfaces which border the porous membrane interior. The membrane has two asymmetric regions, the first asymmetric region having pores with rising diameter proceeding from the first main surface in the direction of the membrane interior and the second asymmetric region having pores with likewise rising diameter proceeding from the other main surface in the direction of the membrane interior.

U.S. Pat. No. 8,925,737 B2 discloses a laminate composed of two polymer layers which differ in terms of their crystallinity (proportion of amorphous regions in relation to the proportion of crystalline regions in the alignment of all polymer chains). The first polymer layer has a truncated cone-shaped pore-size distribution with L1>L2, whereas the second polymer layer likewise has a truncated cone-shaped pore-size distribution with L3>L4, the bottom opening L2 of the truncated cone of the first polymer layer being greater than the top opening L3 of the truncated cone of the second polymer layer.

It is an object of the present invention to provide a serial arrangement of filter media for filtration, the aim being that the serial arrangement efficiently achieves a high service life with a simultaneously high separation rate for components to be removed, and to provide a production method for the serial arrangement, a filtration unit comprising the arrangement, uses of the serial arrangement and a method for characterizing the pore sizes or the porosity of a filter medium across the cross-section of the filter medium.

This object is achieved by the embodiments characterized in the claims.

According to the invention, a "serial arrangement of filter media" is understood to mean a sequence of filter media in which multiple plies of asymmetric filter media are arranged sequentially one after another or connected in series, it being possible for the plies to directly adjoin one another or to be separated from one another by spacers, for example porous support structures, inserted in between.

Particularly preferably, the serial arrangement according to the invention is an assembly composed of n plies of asymmetric filter media which are loosely stacked on top of one another, and wherein the edge regions of the plies are embedded in a filter housing. According to this preferred embodiment, it is only in the non-filter-active edge regions of the plies that the plies are embedded in a filter housing, so that the filter-active regions of the filter media are available for filtration. "Loosely stacked on top of one another" means that the n plies are not directly connected to one another or fixed to one another, but are arranged below one another in series without firm connection of the plies.

According to the invention, a "ply" is understood to mean a planar structure. "Planar" means that the structure (e.g., a filter medium, a membrane, a serial arrangement or an assembly) has two opposite main surfaces which are predominantly level and are largely parallel to one another. "Main surfaces" are the faces of the structure having the greatest surface area.

The term "microporous" refers to filter media or membranes having preferred pore sizes of 0.01 to 100 μm.

The expressions "thickness direction" and "direction of the face normals" refer to the direction which runs perpendicularly to the main surfaces of a planar structure (e.g., a filter medium, a membrane, a serial arrangement, or an assembly comprising filter media). "Face directions" run in parallel to the main surfaces. A "cross-section" is a section along the thickness direction/in the direction of the face normals.

In general, an asymmetric filter medium is understood to mean a porous filter medium having two main surfaces opposite to one another, the pores of one main surface being greater than those of the opposite main surface. According to this definition, the asymmetry factor indicates the ratio of the pore size on the coarse-pored surface to the pore size on the fine-pored surface. The asymmetric filter medium can be a flat or hollow-fiber membrane, a nonwoven, a woven, a monolithic filter medium or a depth filter. Particularly preferably, the asymmetric filter medium is an asymmetric microporous membrane.

In general, an asymmetric microporous membrane is understood to mean a continuously porous polymer film having two main surfaces opposite to one another, the pores of one main surface being greater than those of the opposite main surface. According to this general definition, the asymmetry factor indicates the ratio of the pore size on the coarse-pored surface to the pore size on the fine-pored surface.

According to the present invention, an "asymmetric" filter medium or an "asymmetric" membrane has pore sizes which vary in the thickness direction (cf. for example EP 0 407 800 A2 or EP 0 345 781 A2). The "asymmetry factor" is the ratio of the greatest pore size to the smallest pore size of the pore sizes varying in the thickness direction. Specifically, the asymmetry factor is, according to the invention, defined as follows.

To determine the asymmetry factor, each of the n plies of the serial arrangement is conceptually subdivided along the thickness direction into four sections (see the serial arrangement depicted in FIG. 1, having plies F1 and F2 and also sections F1-1 to F1-4 and F2-1 to F2-4, respectively). The four sections belonging to a ply each have the same thickness, it being possible for the plies (and thus the sections of different plies) to have different thicknesses.

Each of the four sections of a ply has an average pore size. The average pore size of the sections can be ascertained by the characterization method according to the invention or as described in the examples below. The asymmetry factor of a ply is the ratio of the greatest average pore size to the smallest average pore size of the four sections of a ply. The overall asymmetry factor of the n plies is the ratio of the greatest average pore size to the smallest average pore size of the 4n sections.

In contrast to the general definition of membrane asymmetry, which merely depends on the pore sizes of the opposite main surfaces, the invention involves the incorporation of the pore sizes of the entire filter-media or membrane cross-section in the calculation of the (overall) asymmetry factor. What is obtained as a result is a vastly more differentiated picture of the pore structure. Even relatively small differences between different filter media/membranes can therefore be detected. Furthermore, realistic detection of pore-size or porosity gradients and hence accurate examining of influences of production conditions on pore-size or porosity gradients are possible on the basis of the claimed definition of the (overall) asymmetry factor. As a result, it is possible to produce filter media/membranes having defined pore-size or porosity gradients, to characterize them and to find pore-size gradients having advantageous technical effects.

The present invention provides, in one aspect, a serial arrangement comprising n plies, wherein n is at least two, each of the n plies is an asymmetric filter medium having an asymmetry factor of at least 1.5, the n plies have an overall asymmetry factor of at least 10, and the pore size of the n plies substantially continuously decreases in the thickness direction of the serial arrangement.

Because the pore size of the n plies substantially continuously decreases in the thickness direction of the serial arrangement, the serial arrangement according to the invention has a direction of decreasing pore sizes in the thickness direction, which is referred to below as filtration direction (flow direction) (see FIG. 1). The main surface opposed to the filtration direction is the inflowing-side main surface, and the main surface following in the filtration direction is the outflowing-side main surface. Where necessary and unless otherwise stated, the n plies are enumerated in the filtration direction. This means that the first ply is the outer ply on the inflowing side and the n-th ply is the outer ply on the outflowing side (see FIG. 1).

According to the invention, the pore size of the n plies substantially continuously decreases in the thickness direction of the serial arrangement. This means that the n plies of the serial arrangement have a wastage of at most 30%, preferably at most 20%, especially preferably at most 15%, yet more preferably at most 5% and most preferably 0%.

If the average pore size of a section downstream in the filtration direction is greater than the average pore size of the upstream section, the region of the downstream section having a greater pore size remains substantially unused because the medium in the upstream ply has already flowed through a region having a smaller pore size. What is present is a so-called "wastage" or a "dead volume", which is only available for soil absorption (absorption of components to be filtered) with limited efficiency (see FIG. 2).

Method for Determining Wastage

As depicted in FIG. 2 by way of example, what are plotted in an XY graph are the average pore sizes of the 4n sections (X-axis, referred to as "average path length" in FIG. 2) against the thickness of the n plies or sections (Y-axis), in each case with particularly preferably a three-digit accuracy. This means that, in the XY graph, each average pore size is assigned to the location of the associated section ("depth" of the section in the n plies) in order to obtain a pore-size profile of the n plies/4n sections that is resolved in the thickness direction. The average pore sizes can be determined using the characterization method according to the invention or as described in the examples.

The pore-size profile indicates the average pore sizes of each section. Here, the pore size (X-axis) is plotted on the segment of the Y-axis that corresponds to the middle of the section in the flow direction. This means that the average pore size (X-value) of the j-th section (j is 1, 2, 3 or 4) from the n-th ply has assigned thereto the thickness of all n−1 preceding plies plus the thickness of all preceding sections j−1 plus the half-thickness of the j-th section as the Y-value. (Here, it is basically irrelevant whether the plies and sections are enumerated in or against the filtration direction.) In the XY graph, all mean values of sections adjacent to one another are then connected to one another by lines (connection lines).

If it is established that there is, proceeding from one of the two outer sections, a sequence of sections respectively adjacent to one another with no increase in the average pore size between two adjacent sections, no wastage is present. (In this case, for the sequence of sections proceeding from the other of the two outer sections, there is no decrease in the average pore size between two adjacent sections.)

Otherwise, i.e., if a wastage is present, what is used for the following analysis is that sequence of the two sequences of sections respectively adjacent to one another that has the lower number of sections adjacent to one another with increasing average pore size. Thus, the analysis starts from the inflowing side. This means that the analysis is done in the filtration direction. (Accordingly, the corresponding analysis of the example depicted in FIG. 2 starts from the top, since only two sections adjacent to one another with increasing average pore size are present in this consideration.)

In other words, the inflowing direction is chosen such that the pore sizes become continuously smaller, if the complete sequence of average pore sizes is constituted such that the pore sizes continuously decrease or continuously increase in the sequence. In this case, no wastage is present. Otherwise, i.e., if a wastage is present, the inflowing direction/inflowing side is defined such that the wastage is minimal.

Proceeding from any point of the XY graph that corresponds to a section having a smaller average pore size than the adjacent following section, a perpendicular line is drawn in in parallel to the Y-axis. The segment on the Y-axis (thickness) from the point corresponding to the preceding section having a smaller average pore size up to the next intersection point having a connection line is regarded as a wastage region. (In the example of FIG. 2, two wastage regions having a respective segment on the Y-axis (thickness) of 68 µm and 40 µm are identified.) The sum of the thicknesses of all wastage regions is the total wastage region. (In the example of FIG. 2, this is 108 µm.) The percentage ratio of the total wastage region to the total thickness of all 4n sections is the wastage. (in the example of FIG. 2, this is 108 µm/396 µm·100%=27.3%). The value of 396 µm arises here from the difference between the uppermost graph point (430 µm) and the lowermost graph point (34 µm) of FIG. 2.

In the case of a filtration using the serial arrangement according to the invention, the flow direction of the liquid to be filtered (filtration composition) runs in the filtration direction, i.e., in the direction of decreasing pore size. The substantially continuously decreasing average pore size of the n plies in the thickness direction/filtration direction (funnel structure; see FIG. 1) means that, when filtering especially filtration compositions containing particles, the entire filter-media or membrane volume is used for the size-exclusion of particles present in the filtration composition ("soil absorption"/absorption of components to be filtered) and the service life ("absorption capacity for components to be filtered") of the serial arrangement according to the invention is maximized. Service life can be determined as specified in the examples.

According to a preferred embodiment of the present invention, the average pore size of the 4n sections continuously decreases in the thickness direction. This means that the average pore size of the following section is preferably always smaller than the pore size of the preceding section.

According to the invention, the serial arrangement has at least two plies. In principle, inserts or spacers can be situated between the plies, though preferably all plies directly adjoin one another without a spacer or insert being situated between two adjacent plies. The inserts or spacers can be commercially available planar porous media, for example nonwovens or wovens.

According to a preferred embodiment, the serial arrangement comprises 2 to 10 plies. What should be borne in mind is that "n" is a natural number. There are particularly preferably 2 to 6, especially preferably 2 to 4, yet more preferably 2 or 3 and most preferably 3 plies. A higher number of plies and hence a higher total thickness of the composite means that it is possible, owing to the larger volume of the composite, for more particles to be caught or depleted in principle and thus for higher service lives to also be achieved in principle. Preferably, the serial arrangement consists of the n plies, n being a natural number.

The n plies are preferably not connected to one another. It is preferred that the n plies loosely lie on top of one another.

Preferably, the n plies are flat filter media (planar filter media), yet more preferably flat membranes, especially preferably flat polymer membranes. Polymer membranes are constructed from a polymer or polymer blend. Suitable polymers are, for example, cellulose derivatives such as, for example, cellulose hydrate, cellulose ester, cellulose nitrate and cellulose acetate, but also regenerated cellulose, polyamides such as, for example, nylon and perlon, fluoropolymers such as, for example, polytetrafluoroethylene (PTFE) and polyvinylidene difluoride (PVDF), olefins such as, for example, polyethylene and polypropylene, polysulfones such as, for example, polysulfone, polyarylsulfone and polyethersulfone, polyacrylic acid, polymethacrylic acid, acrylic acid-methacrylic acid copolymer and mixtures thereof and crosslinked polymers and mixtures thereof, particularly preference being given to polyethersulfone.

According to a preferred embodiment, the microporous membranes are flat membranes or hollow-fiber membranes.

For each ply, it is preferred that those sections that have the largest or smallest average pore diameter are the outer sections of the ply (first and fourth section). For the serial arrangement, it is preferred that the sections of the serial arrangement having the largest or smallest average pore diameter of all 4n sections of the serial arrangement are the outer sections of the serial arrangement (first section of the first ply and fourth section of the n-th ply).

According to a preferred embodiment of the present invention, the asymmetry factor of adjoining plies decreases in the filtration direction. This means that, in the case of two plies, the first ply has a higher asymmetry factor than the second ply following in the filtration direction (see FIG. 1).

According to a further preferred embodiment of the present invention, the asymmetry factor of adjoining plies increases in the filtration direction. This means that, in the case of two plies, the first ply has a smaller asymmetry factor than the second ply following in the filtration direction.

Furthermore, it is preferred that the asymmetry factor of adjoining plies remains the same in the filtration direction. According to the invention, the asymmetry factor is used with two-digit accuracy (e.g., "12", "1.5" or "0.87") and calculated on the basis of the average pore size with three-digit accuracy.

According to a preferred embodiment of the present invention, the average pore size of the sections (one, several or all of the n plies) of the serial arrangement decreases linearly, concavely or convexly in the thickness direction (see FIG. 4). Particularly preferably, the average pore size of the 4n sections of the serial arrangement decreases linearly, concavely or convexly in the thickness direction. It is also possible to combine plies having a linear, concave and/or convex decrease in the average pore size in a serial arrangement. "Linear" means that the average pore size decreases steadily in the filtration direction (see FIG. 4A), "convex" means that the average pore size decreases ever more slightly in the filtration direction (see FIG. 4) and "concave" means that the average pore size decreases ever more strongly in the filtration direction (see FIG. 4C). The average pore sizes can be determined by the characterization method according to the invention or as described in the examples.

A linear, convex or concave decrease in the pore size in the filtration direction means that the serial arrangement according to the invention can be matched with the particle-size distribution of a medium to be filtered. If the medium contains a high proportion of large particles to be filtered and only a few small particles, optimal efficiency can be achieved by a concave decrease. If, in the reverse case, the proportion of large particles is small in relation to the proportion of small particles, a convex decrease is particularly suitable. In the case of a largely homogeneous particle-size distribution, a linear decrease can deliver the best results.

The n plies of the serial arrangement preferably have an average porosity of more than 60%. As average porosity, it is possible to use the below-described physical porosity ($\varepsilon p$).

Preferably, the four sections of each of the n plies have average pore sizes of at least 0.05 μm.

According to a preferred embodiment, the serial arrangement has a thickness of 100 to 1000 μm, preferably 120 to 800 μm, particularly preferably 150 to 600 μm.

In a preferred embodiment of the serial arrangement according to the invention, the thickness of the plies is, independently of one another, 50 to 250 μm, preferably 100 to 200 μm. Within these ranges, an efficient producibility of the plies can be achieved.

Preferably, the n plies of the serial arrangement each have a radiation resistance of at least 20 kGy, particularly preferably at least 50 kGy, especially preferably at least 100 kGy. As a result, the n plies are sterilizable with gamma radiation, and a gamma radiation-sterilizable serial arrangement can therefore be obtained. The radiation resistance of the n plies/of the serial arrangement according to the invention has no upper limit and is preferably at most 500 kGy, particularly preferably at most 200 kGy. According to the invention, a "radiation resistance of X kGy" is understood to mean that the loss of strength of a ply after gamma irradiation at a dose of X kGy is at most 30% (X can assume any value and is, for example, 20 kGy, 50 kGy, 100 kGy or 500 kGy). Said loss of strength is yielded by the decrease in the strength value of the ply after the gamma irradiation at a dose of X kGy, based on the strength value of the ply before the gamma irradiation at said dose. If the strength value of the irradiated ply is 80% of the strength value of the unirradiated ply, the loss of strength is, according to the invention, 20%. In the context of the present invention, the strength values of the irradiated and unirradiated ply are described by its maximum tensile force value $F_{max}$ at room temperature. To determine $F_{max}$, a sample of the ply having the dimensions 20 mm×150 mm is cut out for this purpose and clamped horizontally into a "Zwick Z2.5/TN1S" materials testing machine from Zwick GmbH such that the free sample length between the clamping jaws is 4 cm. The force transducer "KAP-Z 200N" (A.S.T., 01287 Dresden, Germany) is moved at a speed of, for example, 5 cm/min. The measurement data are continuously acquired and visualized by the instrument software "testXpert" (Zwick GmbH, 89079 Ulm, Germany). $F_{max}$ is determined as the mean value of three irradiated samples of the ply or three unirradiated samples. The radiation resistance of the ply or of the serial arrangement according to the invention means that the serial arrangement or the filtration unit according to the invention need not be autoclaved for the purpose of sterilization, but can be sterile-prepared for use by high-energy radiation, for example gamma radiation. Consequently, the arrangement and the filtration unit according to the present invention are particularly suitable for the sterile-filtration of fluids owing to the radiation resistance.

In a further aspect, the present invention provides a method for producing the serial arrangement according to the invention, comprising, for the production of each of the n plies, in each case the steps of (A) providing a casting solution containing a membrane-forming polymer and a solvent, (B) forming a film by application of the casting solution to a level support, (C) conditioning the film by introduction of the film into a gaseous atmosphere containing a first precipitant ("vapor-induced phase separation", VIPS) and (D) precipitating the ply by introduction of the conditioned film into a precipitation bath containing a second precipitant ("nonsolvent induced phase separation", NIPS), in order to obtain the n plies; and (E) laying the n plies on top of one another.

For each ply, steps (A) to (D) are passed through separately and under modified conditions. Once the plies are available, they are laid on top of one another or arranged on top of one another in step (E) in order to obtain the serial arrangement according to the invention. As already mentioned above, the n plies in the serial arrangement according to the invention are preferably not connected to one another.

The membrane-forming polymer used can, in principle, be any polymer which is suitable for generating microporous membranes, such as the ones mentioned above, preference being given to polyethersulfone. The proportion of the membrane-forming polymer is, for example, 5% to 50% by weight, preferably 8% to 20% by weight of the casting solution.

The solvent used can be any solvent suitable for the precipitation bath method. Examples thereof are polar aprotic solvents such as ε-caprolactam, dimethylformamide (DMF), N-methylpyrrolidone (NMP), dimethylacetamide (DMAc), dimethyl sulfoxide (DMSO) and 2-pyrrolidone and also mixtures thereof. The proportion of the solvent is, for example, 50% to 95% by weight, preferably 70% to 92% by weight of the casting solution.

Optionally, the casting solution can contain at least one cosolvent. A suitable cosolvent is, for example, low-molecular-weight polyethylene glycol ($M_w$ is preferably 200 to 1500 g/mol).

Furthermore, the casting solution can contain a pore former. The pore former is not subject to any particular restriction. Suitable combinations of membrane-forming polymer and pore former are known to a person skilled in the art. For example, low-molecular-weight alcohols, various inorganic salts, such as, for example, lithium chloride, high-molecular-weight polyethylene glycols ($M_w$>1500 g/mol), polyvinylpyrrolidone (PVP), polyvinyl alcohol (PVA) or mixtures thereof can be used. The proportion of the pore former is, for example, 0% to 15% by weight, preferably 0.5% to 10% by weight of the casting solution.

Step (A) can be carried out by mixing of the constituents of the casting solution, for example by stirring. The duration of the mixing until the dissolution of all the constituents of the casting solution depends on the mass of the casting solution provided and is, for example, 1 to 50, preferably 8 to 16 hours. Typical batch sizes in step (A) are in the range from 100 to 5000 kg of casting solution.

Once all the constituents of the casting solution are present in dissolved form, the casting solution is preferably degassed, for example at 100 to 800 mbar, for example at 300 mbar. The degassing prevents defects from uncontrollably forming in the membrane in the course of the method.

In step (B) of the production method according to the invention, a film is formed by application of the casting solution to a level support. This can, for example, be carried out by means of a nozzle, preferably at a casting solution temperature of 10° C. to 60° C. The film usually has a thickness of 50 to 500 μm, preferably 100 to 250 μm.

The support is preferably a drum, particularly preferably composed of steel, so that the film can be fed to the following method steps by movement of the drum. As a result, a continuous and efficient conduct of the method is possible. The drum preferably has a temperature of 10° C. to 60° C.

In step (C), the film is conditioned by introduction of the film into a gaseous atmosphere containing a first precipitant. During step (C), the first precipitant diffuses into the initially transparent film, whereupon said film usually becomes turbid, this indicating a commencing precipitation reaction and structural formation of the later ply. In the conditioning step for the film, the pore structure of the membrane starts to form. The duration of the conditioning step is, for example, 1 s to 300 s.

To generate an asymmetric structure, it is necessary to condition the casting film in the first stage (C) by introduction into a gaseous atmosphere containing the first precipitant (VIPS process). Precipitant inputted via the atmosphere shifts the composition of the casting film in such a manner that a phase separation is initiated at the side of the casting film that is facing the gaseous precipitant. The penetration depth of the incipient phase separation is dependent on the process parameters chosen.

Suitable as first precipitant are, in principle, all liquids with which the membrane-forming polymer in the film can be precipitated. Alkanols and water and also mixtures thereof are suitable.

The gaseous atmosphere, containing the first precipitant, preferably has a temperature of 10° C. to 60° C. Besides the precipitant, the gaseous atmosphere preferably contains a gas or gas mixture, for example air or nitrogen, preference being given to nitrogen. The pressure of the gaseous atmosphere is preferably 800 to 1200 mbar, preferably 900 to 1100 mbar. Preferably, the gaseous atmosphere is saturated with the first precipitant.

In step (D), what is carried out is the precipitation of the ply by introduction of the conditioned film into a precipitation bath containing a second precipitant. Preferably, the precipitation bath consists of the second precipitant. Suitable as second precipitant are, in principle, all liquids with which the membrane-forming polymer in the film can be precipitated. Alkanols and water and also mixtures thereof are suitable.

In the precipitation bath, the precipitant diffuses into the pre-precipitated film, and the solvent of the casting solution, additives and the pore former (e.g., PVP) diffuse into the precipitation bath from the membrane that forms, the result being that the ply/membrane is obtained.

Step (D) (NIPS process) leads to a more rapid precipitation compared to step (C), due to introduction/immersion of the conditioned film into a precipitation bath containing the second precipitant. Here, the second precipitant diffuses into the film and, at the same time, the solvent diffuses out of the film, with the result that the phase separation is continued and structures formed during the conditioning are solidified.

The pore size of the membrane (average pore size of all 4 sections) is controlled within the VIPS stage (step (D)). The concentration of the membrane-forming polymer in the casting solution is generally inversely proportional to the achievable pore size.

The membrane structure is, inter alia, a function of the residence time of the casting film in the conditioning phase.

Step (D) can be followed by an extraction step, in which the precipitated ply is introduced into an extraction bath. Preferred compositions of the extraction bath correspond to those of the second precipitant. In the extraction step, the ply is preferably successively introduced into a series of multiple extraction baths in order to remove solvents, pore formers and swelling agents that may still be present in the ply/membrane.

Step (D) or, if applicable, the extraction step can be followed by a rinsing step, in which the precipitated ply is introduced into a rinsing bath. Preferably, the rinsing bath is composed of water. In the rinsing step, the ply is preferably successively introduced into a series of multiple rinsing baths in order to remove the precipitant that may still be present in the ply/membrane.

If necessary, multiple extraction steps and rinsing steps can be carried out in succession and/or in an alternating manner.

By means of an appropriate process control, it is possible for the precipitants, solvents, swelling agents, etc., that were used to be processed and reused.

Finally, the plies/membranes obtained in the respective steps (A) to (D) are laid on top of one another in step (E), and the serial arrangement according to the invention is obtained as a result.

In a further aspect, the present invention provides a filtration unit comprising a serial arrangement according to the invention. The filtration unit can be a cassette, a plate module, a hollow-fiber module, a pleated cartridge or a capsule. The serial arrangement according to the invention and the filtration unit according to the invention are especially suitable for clarification of solutions, for sterile-filtration, for filtration of viruses and for filtration of mycoplasmas.

Preferably, the filtration unit is a sterile filter in accordance with ASTM F 838-05, 2005 and ASTM F 838-15a, 2015. The permeability of the sterile filter is preferably at least 10 000 L/(m²·h·bar). The permeability can be measured as described below. The service life (Caro®/Ovomaltine®) of the sterile filter is preferably at least 350 kg/m², particularly preferably at least 400 kg/m².

According to a further preferred embodiment, the filtration unit is a *mycoplasma*-retentive filter in accordance with PDA Technical Report No. 75, Consensus Method for Rating 0.1 µm *Mycoplasma* Reduction Filters. The permeability of the *mycoplasma*-retentive filter is preferably at least 2000 L/(m²·h·bar). The permeability can be measured as described below. The service life (Caro®/Ovomaltine®) of the sterile filter is preferably at least 300 kg/m², particularly preferably at least 350 kg/m².

Method for Measuring Permeability

The membranes to be tested are fitted into a suitable filter holder as 47 mm punches. The free filter surface area is 12.7 cm². At a pressure of 1.0 bar, 100 mL of deionized water are filtered through the membrane at a temperature of 20° C. and the time $t_{Dfl}$ [s/100 mL*12.7 cm²*1.0 bar)] required therefor is ascertained by means of a stopwatch. The volume of deionized water can be determined volumetrically or gravimetrically. The conversion to permeability J in (L/m²*h*bar) is yielded according to the following formula:

$$J = 1/t_{Dfl} \cdot 283\ 465$$

Preferably, the filtration unit has a radiation resistance of at least 20 kGy, particularly preferably at least 50 kGy, especially preferably at least 100 kGy. As a result, the filtration unit is sterilizable with gamma radiation.

In a further aspect, the present invention provides a method for characterizing the pores of a filter medium. The method comprises the steps of
(1) fixing the filter medium;
(2) producing a cross-sectional preparation for scanning electron microscopy by cutting, grinding and polishing of the fixed filter medium in the thickness direction;
(3) generating a gray-scale image of the cross-section of the filter medium by scanning electron microscopy analysis of the preparation;
(4) generating a binarized image by binarization of the gray-scale image, the binarized image being made up of first and second pixels and the first pixels representing a pore wall and the second pixels representing a pore interior;
(5) subdividing the binarized image into four sections, with the result that each section depicts an equally thick region of the cross-section of the filter medium and has multiple rows of first and second pixels, the rows comprising series of second pixels;
(6) determining section-by-section the number of second pixels of each series of second pixels and the number of series of second pixels; and
(7) calculating section-by-section the average pore size from the arithmetically averaged number of second pixels per series of second pixels.

The described method is related to methods known from the literature (Journal of Membrane Science 323 (2008) 241-246), but differs in the details of the preparation and method of analysis. Contrary to what is described in the literature, the binarization is carried out with reference to the physical porosity, as described below.

Steps (1) and (2) are not subject to any particular restriction and can, in principle, be carried out in any manner usual for producing a preparation for scanning electron microscopy (SEM), for example as described in Journal of Membrane Science 372 (2011) 66-74.

In step (1), the filter medium is preferably embedded in a plastic resin at room temperature (25° C.) (cold embedding). To this end, the filter medium is first impregnated with an uncured plastic resin, with the result that the filter medium is completely wetted with the plastic resin and all pores of the filter medium are hence filled up. Thereafter, the plastic resin is cured. Suitable plastic resins are known to a person skilled in the art und encompass, for example, polyurethane (PU) and epoxy resins. As a result of the fixation, a high level of stability is imparted to the filter medium, meaning that a preparation for SEM analysis can be produced from the fixed filter medium.

The production of the cross-sectional preparation is carried out in step (2) by cutting of the fixed filter medium in the thickness direction of the filter medium, followed by grinding and polishing (e.g., using an EcoMet/Automet™ 250 grinder and polisher from Buehler ITW Test & Measurement GmbH, Esslingen am Neckar). The fixed filter medium that has been cut is subsequently semiautomatically ground (4 different particle sizes: P320, P600, P1200, P2500) and polished (3 µm diamond and aluminum oxide suspension) in order to obtain sufficiently smooth sample surfaces for examination by a BSE detector (backscattering electron detector).

In step (3), the preparation is subjected to an SEM analysis, the result being that a gray-scale image of the cross-section of the filter medium is obtained. Different shades of gray represent different regions (pore walls and pore interiors) of the filter medium. Preferably, a scanning electron microscope with backscattering electron detector (BSE detector) is used. In contrast to secondary-emission electron multiplier detectors (SEEM detectors), BSE detectors show a material contrast instead of a topography, and what can be seen as a result in an appropriately obtained SEM image is only the surface of the preparation without the deeper-lying layers. In step (3), a gray-scale image of the preparation is obtained, the gray-scale image being a top view of a cross-section of the filter medium.

When recording the SEM image, the magnification is, especially in narrow-pored regions (regions with pore sizes <0.5 µm), preferably chosen such that pore wall and pore interior are easily distinguishable in the gray-scale image in order to obtain an informative result in the image analysis/binarization of step (4). Using an appropriately chosen magnification, the entire cross-section of the filter medium is recorded. Optionally, multiple individual images of different segments of the cross-section of the filter medium can be generated and be assembled by MIA (multi-image alignment) to form a single gray-scale image.

Preferably, the gray-scale image (SEM image), which consists of pixels arranged in rows and columns, depicts at least 50 pores/row, particularly preferably at least 75 pores/row. This can ensure that, from the gray-scale image obtained, statistically informative results for the average pore size (also referred to as "average path length") are obtained even in coarse-pored regions (regions with pore sizes >3 μm). The above minimum number of pores/row can, for example, be obtained by the MIA (multi-image alignment) already mentioned.

In coarse-pored regions, a "subporosity" is occasionally observed within the pore walls. The "subpores" can represent a source of error for image evaluation, especially when they, in the case of use of a plastic resin in step (1), are not filled or only incompletely filled with the resin. The "subpores" are not reachable for the filtration composition and thus do not have a size-exclusion function, but do influence the overall porosity of the filter medium. To remedy this, the gray-scale image is preferably edited using a hole closing and filling filter before binarization. Hole closing and filling algorithms are known to a person skilled in the art. To avoid the generation of artifacts by the algorithm in the narrow-pored regions of the total image, the intensity of the closing step is preferably adjusted segment-by-segment depending on the pore size. Forming the basis of this is a predetermination of the average pore size up to the hole closing/filling step. In narrow-pored regions (in which no subporosity is present), the gray-scale image is thereby not altered.

For simplified, preferably computer-based evaluation of the gray-scale image, it is converted by binarization into a binarized image in step (4). Customary methods and corresponding computer programs for binarization are known to a person skilled in the art and can be used according to the invention. Before and after binarization, what is preferably carried out in each case is an image processing step (pre-processing and postprocessing) in order to reduce artifacts during binarization. Particularly preferably, a median filter is used for artifact suppression.

For binarization, what is required is a gray-scale threshold value which determines which gray scale of the gray-scale image distinguishes first and second pixels of the binarized image from one another. If the pixels of the gray-scale image are lighter than the threshold value, they belong to the first pixels, which can optionally be shown in white, and if the pixels of the gray-scale image are as dark as or darker than the threshold value, they belong to the second pixels, which can optionally be shown in black. First and second pixels are chosen such that first pixels represent a pore wall and second pixels represent a pore interior.

Contrary to what is described in Journal of Membrane Science 323 (2008) 241-246, the invention involves setting the threshold value in step (4) such that the ratio of the number of second pixels to the sum of the number of first pixels and the number of second pixels of the binarized image corresponds as exactly as possible to the physically determined overall porosity, a deviation of the overall porosity of the binarized image from the physically determined overall porosity by ±3% being tolerated.

The overall porosity of the binarized image is the ratio of the number of all second pixels to the number of all first and second pixels.

Physical porosity ($\varepsilon_p$) is understood to mean the mean porosity value across the entire cross-section of the filter medium. It can be easily calculated from geometric and gravimetric data of a sample of the filter medium:

$$\varepsilon_p = \frac{d_{FM} \cdot A_{FM}}{\frac{m_{FM}}{\rho_{Mat}}}$$

Here, $d_{FM}$ represents the thickness of the sample, $A_{FM}$ represents the surface area of one of the main surfaces of the sample, $m_{FM}$ represents the mass of the sample and $\rho_{Mat}$ represents the density of the material forming the filter medium (e.g., a membrane-forming polymer). The density can either be gathered from the literature or be determined by means of methods known to a person skilled in the art. To determine physical porosity, a circular sample (47 mm diameter) can be taken prior to step (1) from the filter medium region to be examined.

Usually, a pore-size profile that is largely homogeneous in the face directions is possessed by filter media in general und microporous membranes in particular.

In steps (5) and (6), what is carried out is the evaluation of the binarized image in order to arrive at the pore-size profile of the filter medium.

First, the binarized image is subdivided in the filtration direction/thickness direction into four sections of equal thickness in step (5). Each section represents a longitudinal cut of the filter medium along the face direction. The sections run in parallel to one another. The boundaries between the sections run along the face direction, i.e., in parallel to the main surfaces of the filter medium or the equivalents thereof in the binarized image.

Each section of the binarized image comprises a plurality of rows of first and second pixels. Each pixel depicts an equally sized quadratic segment of the cross-section of the filter medium, and the edge length of each pixel square corresponds to a certain length of the filter medium depicted. If multiple second pixels of a row are directly adjacent, the entirety of said second pixels is referred to as "a series of second pixels". A row can contain multiple series of second pixels. The number of second pixels of a series is a measure of the free path length between two pore walls. Accordingly, the average free path length can also be referred to as average pore size. Preferably, a series of second pixels (a pore interior) or a series of first pixels (a pore wall) is only considered interrupted if the series is interrupted by a number of first or second pixels that corresponds to a length of more than 50 nm. Said length corresponds approximately to the penetration depth of electrons, meaning that there is a relatively reliable result in the event of more than 50 nm.

In step (6), the series lengths (number of second pixels of each series) and the series number (number of series of second pixels of each section) are determined. From this, it is possible to calculate the arithmetic mean of the series lengths for each section, said mean being directly proportional to the average pore size of the respective section. Furthermore, the distribution of the series lengths of each section is directly proportional to the pore-size distribution. The ratio of the number of second pores to the number of first pores of a section is directly proportional to the porosity of the respective section. Thus, the method according to the invention makes it possible to obtain cross-sectional profiles of average pore size, of pore-size distribution and of porosity.

A pore-size profile is created using the method according to the invention. To this end, what is calculated in step (7) for each section (section-by-section) is the arithmetic mean of the series lengths, and what is obtained from this by multiplication by a proportionality factor is the average pore size of the respective section.

In a preferred embodiment of the characterization method according to the invention, the filter medium is a microporous membrane.

FIG. 1 shows schematically a serial arrangement according to the invention having two (n=2) plies F1 and F2. Each ply is subdivided into 4 sections F1-1 to F1-4 or F2-1 to F2-4. The filtration direction is indicated by an arrow pointing downward. Two V-shaped lines converging in the filtration direction depict, in each case, decreasing of the pore size of the n plies in the thickness direction or filtration direction. The different gradients of the lines show that, in the preferred embodiment depicted in FIG. 1, the two plies have different asymmetry factors. The two plies are depicted at a distance from one another, but can in reality directly adjoin one another. In this preferred embodiment, the pore sizes of the adjacent plies are approximately identical in the boundary region, and this is depicted by the approximately identical horizontal distance of the respective converging lines in the region of the plies F1-4 and F2-1.

FIG. 2 shows schematically the determination of the wastage of a serial arrangement.

FIG. 3 shows, on the left-hand side, exemplary SEM images obtained by use of a SEEM detector. The SEM images (cross-sectional images) are arranged according to the order of the serial arrangement according to the invention. On the right-hand side, the pore-size profile is shown across the total thickness of the serial arrangement (subdivided into four sections per ply, obtained by the characterization method according to the invention), the average pore size of each ply being depicted by a disk in each case.

FIG. 4 shows schematically a linear (A), a convex (B) and a (C) concave pore-size profile.

FIG. 5 shows schematically comparative examples (A to C, E and F) and a serial arrangement according to the invention having two plies (D).
- A: The serial arrangement has a ply having an asymmetry factor <1.5.
- B: The serial arrangement has a ply having an asymmetry factor <1.5.
- C: The pore size does not substantially continuously fall in the thickness direction. The wastage is more than 30%.
- D: Example according to the invention.
- E: The serial arrangement has a ply having an asymmetry factor <1.5.
- F: The pore size does not substantially continuously fail in the thickness direction. The wastage is more than 30%.

FIG. 8 shows the pore-size profiles of the serial arrangements examined in Example 2 and also the wastage.

The following examples serve to further elucidate the present invention without being limited thereto.

EXAMPLES

Characterization of Pores

For the characterization of the pores of the examined membranes using a MATLAB® routine, the following set of parameters was taken as a basis.
- Loading of the image (dimensions of, for example, 3584×2671 pixels)
- Specification of the image width on the basis of the resolution/magnification: this was adjusted such that clear transitions between pore wall and pore space are identifiable.
- Cropping of the image, so that the membrane completely fills the image (manually in MATLAB®)
- Input of the physical porosity (measured)=80%
- Specification of minimum pore-interior size and minimum pore-wall diameter=0.05 μm (resolution limit due to the penetration depth of electrons)
- Definition of the number of sections=4 Median filters before binarization=3 or median filters after binarization=3
- Binarization with threshold-value criterion "Porosity"
- Median filters before binarization=3
- Hole closing/filling filter of variable intensity, depending on particular average pore size (in segments of 500 image rows; intensity of the hole closing/filling filter: average pore size of the respective segment of 500 image rows/10)
- Output of the average pore sizes per section.

Method for Determining Service Life

Caro/Ovomaltine Service Life

Service life (soil absorption capacity; SL) was ascertained by filtration with a test filtration composition based on an aqueous suspension of a mixture consisting of Ovomaltine® powder and Caro® powder (0.0463% by weight of Caro® powder; 0.0145% by weight of Ovomaltine® powder, the remainder being water) (Caro/Ovomaltine SL). The measurement was carried out using a 47 mm filter housing at a pressure of 1 bar. Filtration was carried out until the transmembrane flow rate was only 5% of the initial transmembrane flow rate. The filtrate was collected and weighed. The amount of filtrate in gram per filter surface area corresponds to the service life.

DMEM/PP3 Service Life

In an alternative method, service life (DMEM/PP3) was carried out by filtration with a test filtration composition based on an aqueous suspension containing 13.4 g/L Dulbecco's Modified Eagle's Medium (DMEM) and 7.5 g/L proteose peptone No. 3 (PP3). The measurement was carried out using a 25 mm polypropylene filter housing at a pressure of 2 bar. Filtration was carried out until the transmembrane flow rate was only 10% of the initial transmembrane flow rate. The filtrate was collected and weighed. The amount of filtrate in gram per filter surface area corresponds to the service life.

Example 1—n=2

Figure 1:
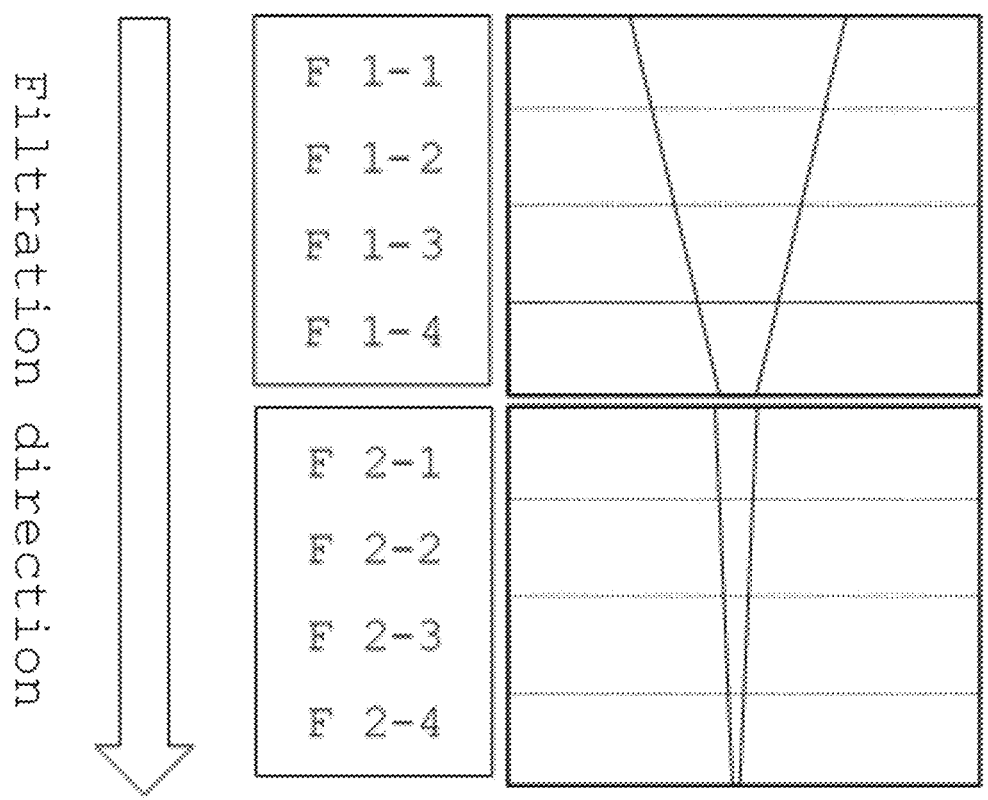
Figure 2:
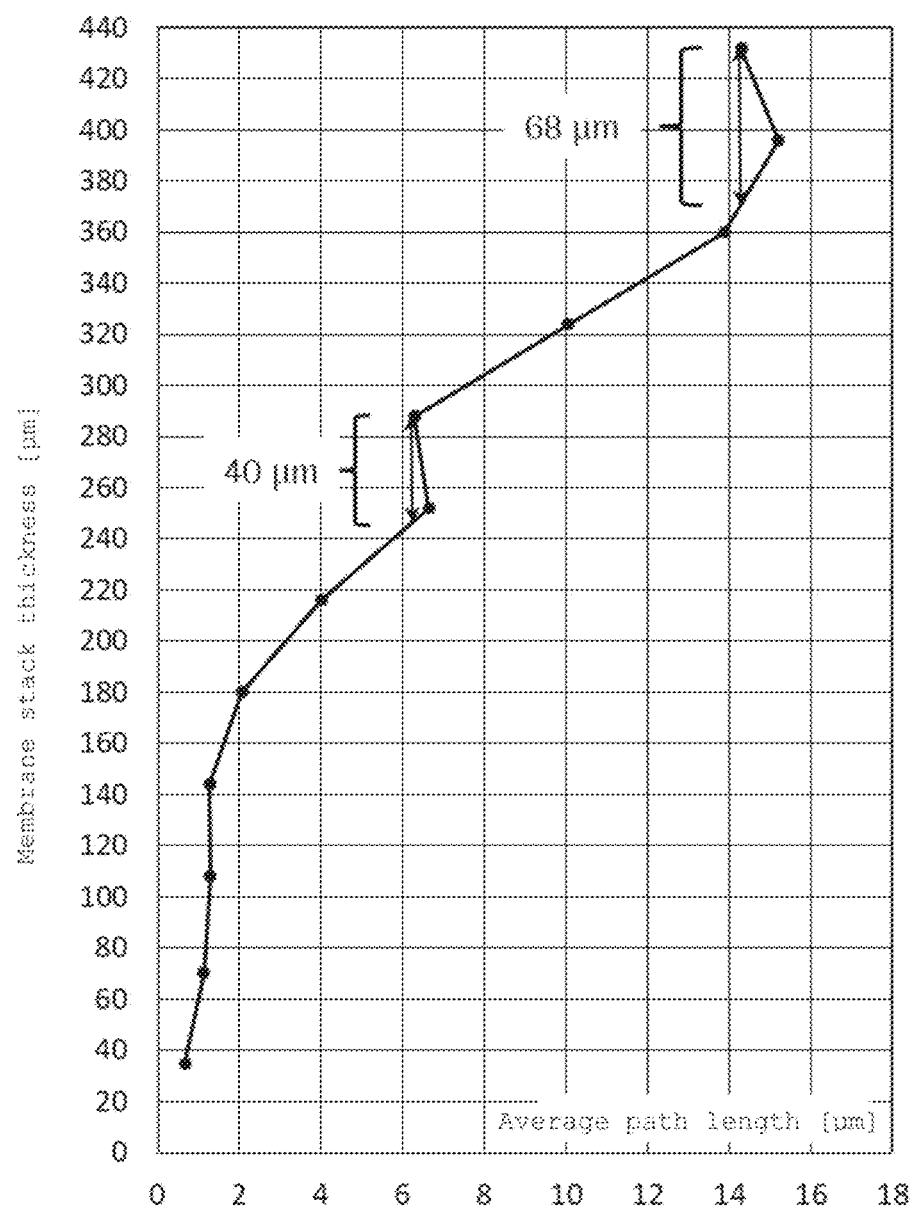
Figure 3:
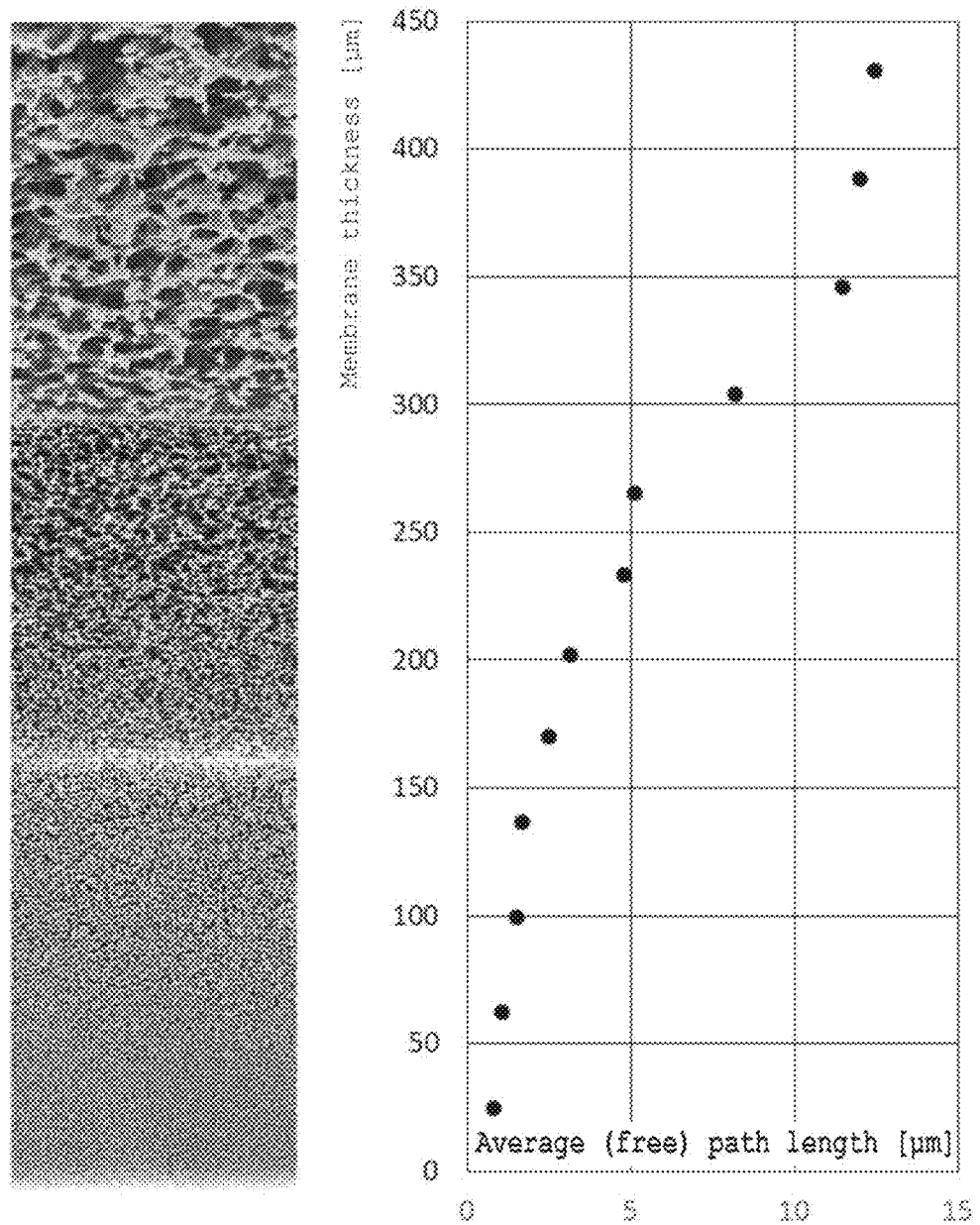
Figure 4:
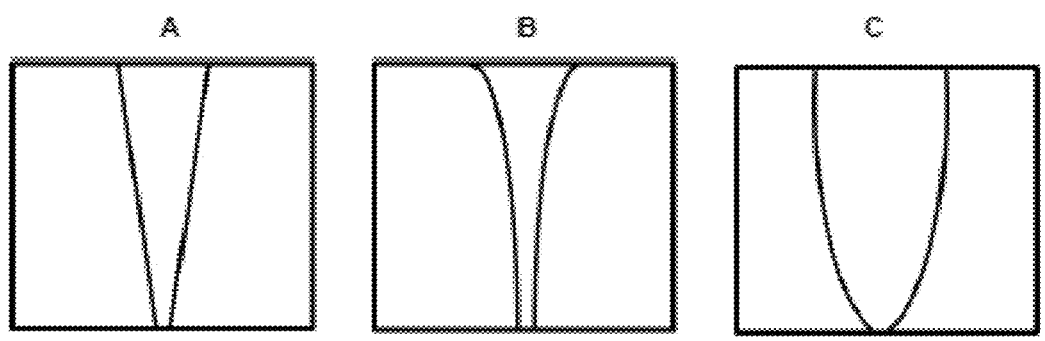
Figure 6:
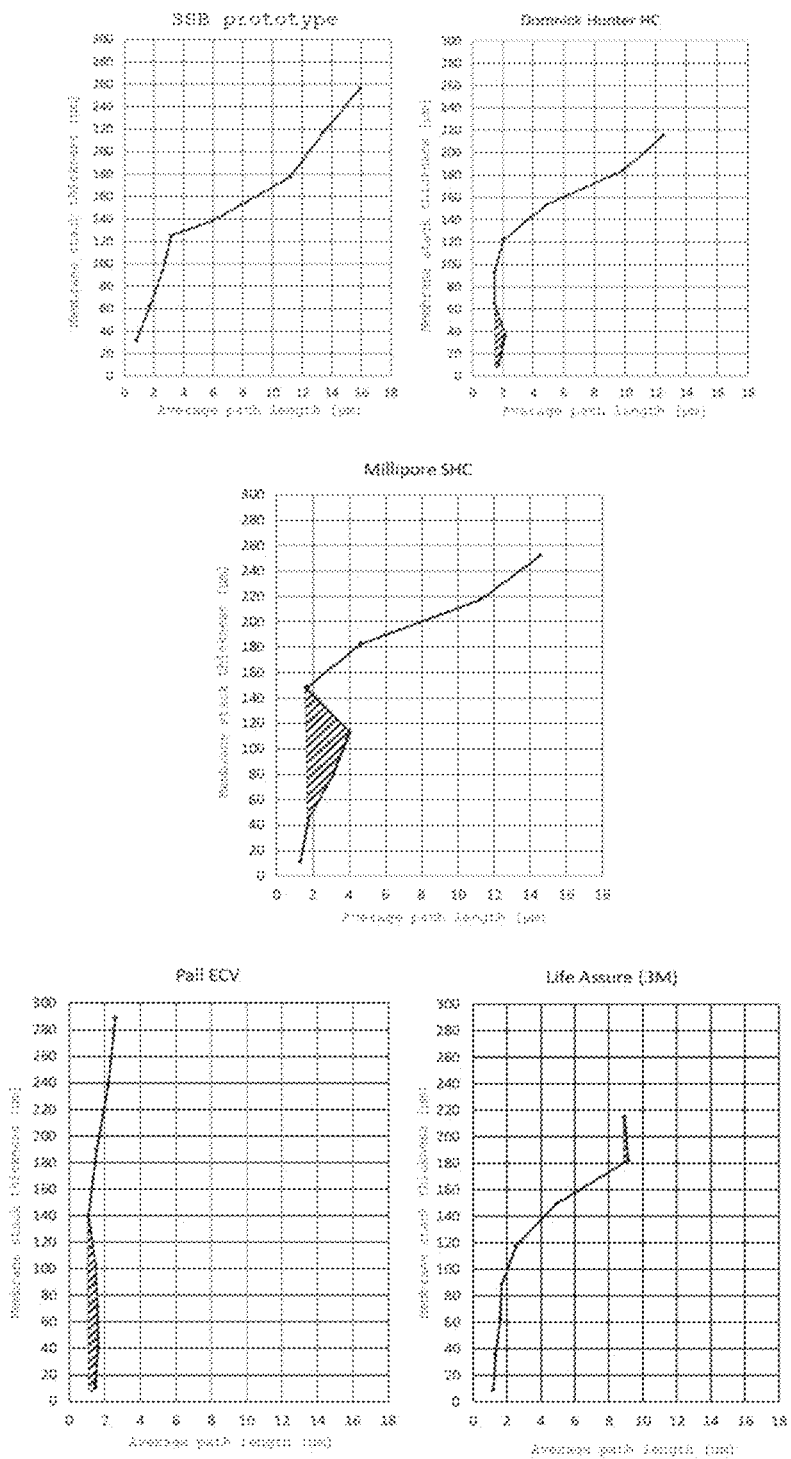
FIG. 6 shows the pore-size profiles of the serial arrangements examined in Example 1 and also the wastage.
Figure 7:
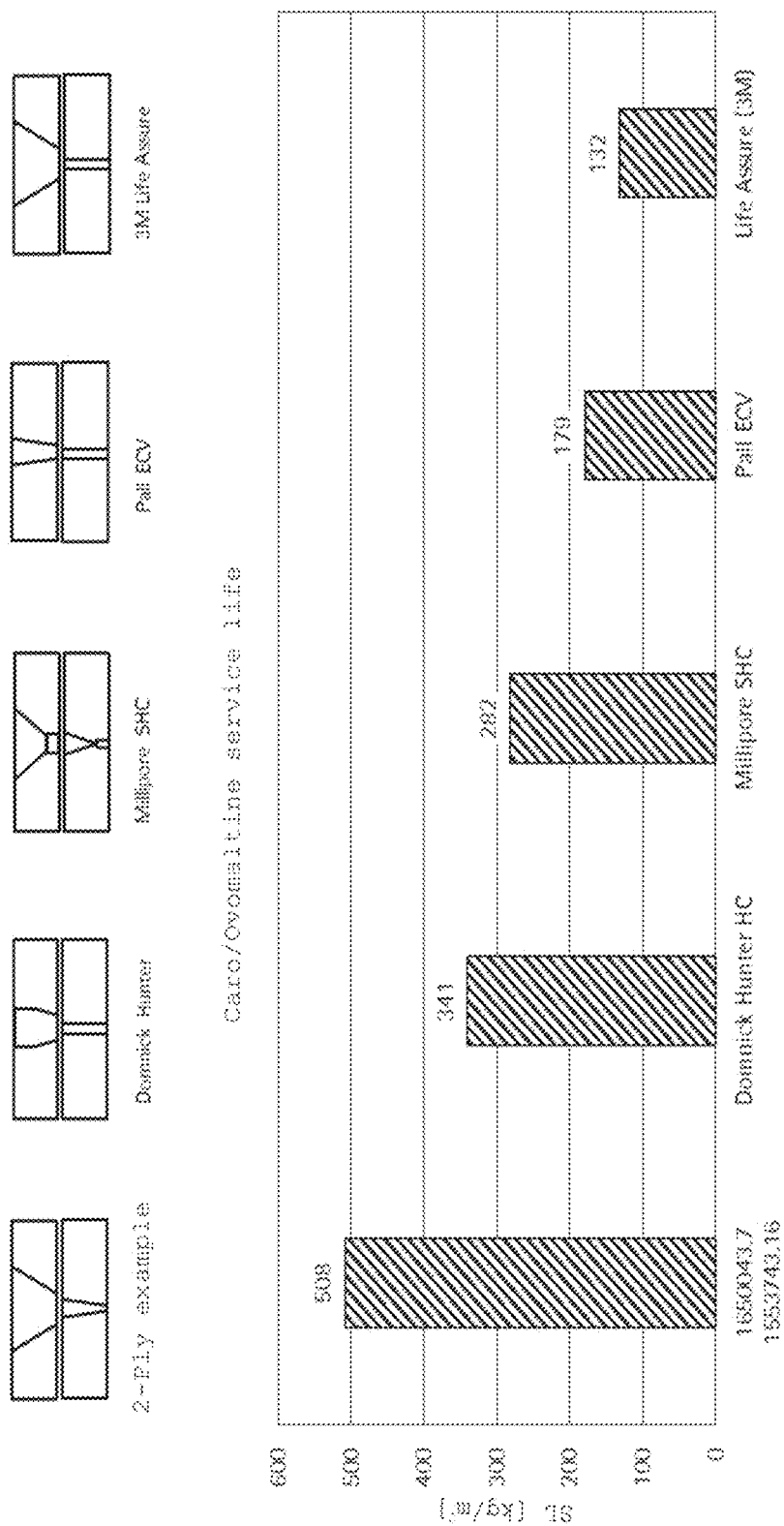
FIG. 7 shows schematically the pore-size profiles of the serial arrangements examined in Example 1 and also experimentally determined service lives of the arrangements (Caro/Ovomaltine).

What were examined were a serial arrangement according to the invention ("SSB Prototype", "1650043.7/1553743.16" "2-ply example") and also the commercially available Domnick Hunter® HC, Millipore® SHC, Pall® ECV and Life Assure from 3M Innovative Properties. The serial arrangements were examined as specified above. The porosity profiles obtained therefrom are shown in FIG. 6. Simplified diagrams of the porosity profiles are shown in FIG. 7.

The service lives of the five different serial arrangements having two plies (n=2) were determined as specified above. The results are shown in FIG. 7 and Table 1.

In the case of the exemplary embodiment according to the invention ("1650043.71553743.16" in FIG. 7), the service life (Caro/Ovomaltine) was 508 kg/m$^2$, whereas in the case of the comparative examples from the prior art, the service lives were only between 132 and 341 kg/m$^2$, the filters in all the examples being sterile filters having the same separation rate (nominal pore size 0.2 μm). Corresponding results were obtained for the DMEM/PP3 service life: the example according to the invention achieved a service life of 2546 kg/m², whereas the comparative examples merely achieved service lives of 2063 kg/m² (Domnick Hunter® HC), 2060 kg/m² (Millipore® SHC), 1423 kg/m² (Pall® ECV) and 1560 kg/m² (Life Assure).

Example 2—n=2 or 3

Serial arrangements according to the invention and comparative arrangements were produced and examined as described above (characterization of pores and determination of service life).

The results are shown in Table 1 and FIG. 8.

Figure 9:
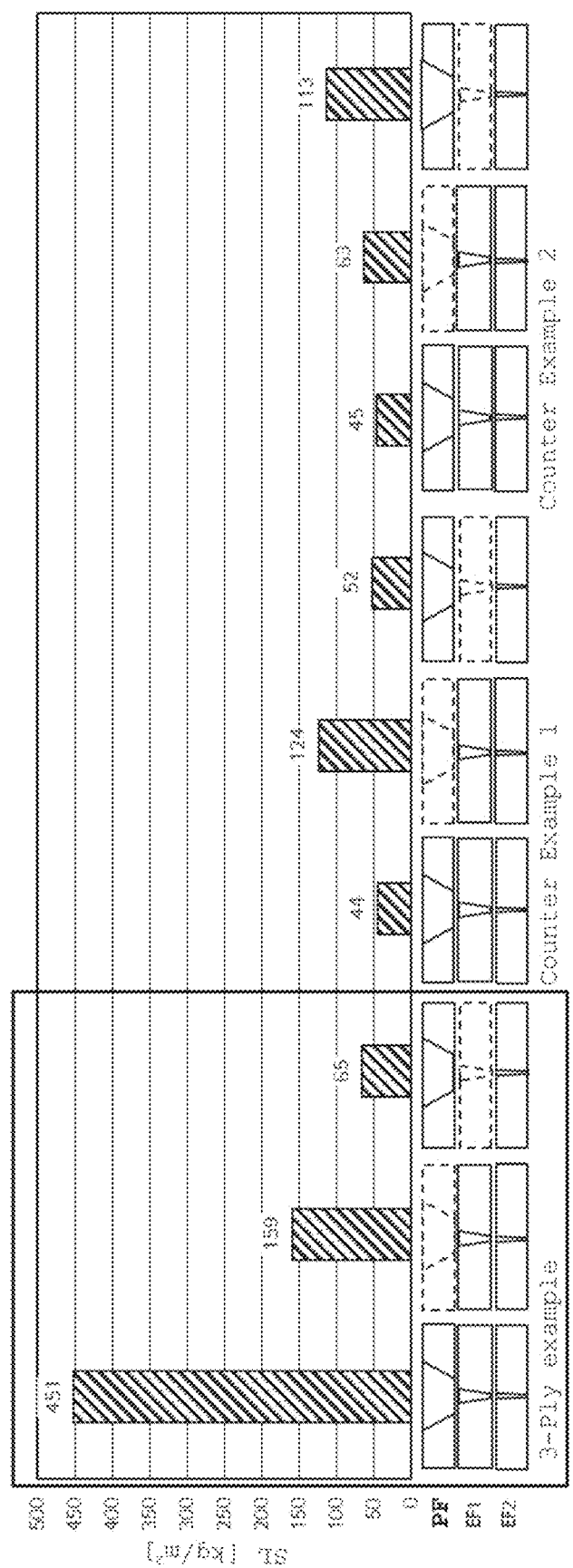
FIG. 9 shows the service lives SL (Caro/Ovomaltine) in kg/m$^2$ for three-ply serial arrangements according to the invention in comparison with two-ply comparative examples which lack either the prefilter, i.e., the first filter ply, or the middle filter, i.e., the second filter ply.

FIG. 9 depicts the service lives Caro/SL of the three-ply example and of the three-ply comparative examples/Counter Examples 1 and 2 (see Table 1 above). Moreover, FIG. 9 shows that, in the case of a particularly preferred embodiment of the serial arrangement according to the invention having three plies and a wastage of at most 30%, it was possible to achieve a particularly high service life of 451 kg/m² whereas in the case of a modification of the three-ply example to form a two-ply serial arrangement by removal of the first ply, i.e., the prefilter PF, the service life dropped to 159 kg/m². The same tendency applies to a modification of the three-ply serial arrangement in which the second ply, i.e., the middle filter EF1, is missing. In said modification, the service life dropped to only 65 kg/m². By contrast, in the case of the three-ply comparative examples "Counter Example 1" and "Counter Example 2", which had a dis-

TABLE 1

|  |  | Three plies | | | Two plies | | | | |
| --- | --- | --- | --- | --- | --- | --- | --- | --- | --- |
|  |  | 3-ply example | Comparative Example 1 | Comparative Example 2 | 2-ply example | Domnick Hunter HC | MP SHC | Pall ECV | 3M Life assure |
| Prefilter membrane | Largest section | 12.4 | 15.2 | 6.2 | 15.9 | 12.5 | 14.6 | 2.6 | 10.4 |
|  | Smallest section | 8.1 | 10.1 | 2.4 | 6 | 2.1 | 1.7 | 1.1 | 2.8 |
|  | Asymmetry | 1.5 | 1.5 | 2.6 | 2.7 | 6.0 | 8.6 | 2.4 | 3.7 |
|  | Thickness (μm) | 155 | 130 | 110 | 160 | 130 | 140 | 200 | 130 |
|  | Wastage (μm) | 0 | 95 | 50 | 0 | 0 | 0 | 0 | 50 |
| Middle membrane | Largest section | 5.1 | 6.6 | 8.7 | | No middle filter | | | |
|  | Smallest section | 2.5 | 2.1 | 2.1 | | | | | |
|  | Asymmetry | 2.0 | 3.1 | 4.1 | | | | | |
|  | Thickness (μm) | 135 | 110 | 135 | | | | | |
|  | Wastage (μm) | 0 | 35 | 135 | | | | | |
| End-filter membrane | Largest section | 1.6 | 1.3 | 1.3 | 3.2 | 2.15 | 4.1 | 1.6 | 1.8 |
|  | Smallest section | 0.8 | 0.7 | 0.7 | 0.8 | 1.45 | 1.3 | 1.4 | 1.3 |
|  | Asymmetry | 2.0 | 1.9 | 1.9 | 4.0 | 1.5 | 3.2 | 1.1 | 1.4 |
|  | Thickness (μm) | 140 | 160 | 160 | 130 | 120 | 140 | 125 | 110 |
|  | Wastage (μm) | 0 | 0 | 0 | 0 | 65 | 100 | 70 | 0 |
| Overall | Thickness (μm) | 430 | 400 | 400 | 290 | 250 | 280 | 325 | 240 |
|  | Wastage (μm) | 0 | 130 | 185 | 0 | 65 | 100 | 140 | 35 |
|  | Wastage (%) | 0 | 33 | 46 | 0 | 26 | 36 | 43 | 15 |
|  | Overall asymm. | 16 | 22 | 9 | 20 | 9 | 11 | 2 | 8 |
|  | Caro SL (kg/m²) | 451 | 44 | 45 | 508 | 341 | 282 | 179 | 132 |
|  | DMEM/PP3 SL (kg/m²) | 2526 | 1823 | 1700 | 2546 | 2063 | 2060 | 1423 | 1560 |
|  | Flow rate (L/m²) | 3300 | 1900 | 1700 | 12 800 | 15 000 | 10 400 | 11 600 | 14 200 |

The entries indicated by "Largest section" or "Smallest section" in Table 1 specify the largest or smallest average pore size from the four section-based pore sizes of the respective ply in micrometers.

As can be seen from Table 1, none of the two-ply serial arrangements Domnick Hunter HV®, Pall® ECV and 3M Innovative Properties Life Assure and the three-ply Comparative Example 2 had an overall asymmetry of 10 or more. Furthermore, the serial arrangements Pall® ECV and 3M Innovative Properties Life Assure both had a ply having an asymmetry factor of less than 1.5. Moreover, the serial arrangements Millipore® SHC and Pall® ECV did not have a substantially continuously decreasing pore size of the two plies in the thickness direction. The wastage was 36% and 43%, respectively. The aforementioned two-ply and three-ply serial arrangements of the comparative examples had a lower service life than the serial arrangements according to the invention having an identical ply number.

Comparative Examples 1 and 2 of Example 2 did not have a substantially continuously decreasing pore size of the three plies in the thickness direction. The wastage was 33% and 46%, respectively. As already mentioned, the aforementioned had a lower service life than the three-ply serial arrangement according to the invention of Example 2.

tinctly higher wastage of 33% (Counter Example 1) and 46% (Counter Example 2), the removal of either the first (PF) or second (EF1) ply from the three-ply serial arrangement hardly had an influence on the anyway distinctly lower service life, which was not more than 124 kg/m² in the case of Counter Example 1 and its two-ply modifications and not more than 113 kg/m² in the case of Counter Example 2 and its two-ply modifications.

The present invention provides a serial arrangement having n plies of asymmetric microporous filter media, especially membranes, that efficiently achieves a high service life. Dead volumes and premature blocking can be avoided. Moreover, with the aid of the characterization method according to the invention, it is possible to characterize filter media exactly, meaning that, in the production method for the serial arrangement, the pore-size profile of each ply can be set in a controlled manner.

The invention claimed is:
1. A serial arrangement of filter media that comprises n plies, wherein
n is 3 to 10,
each of the n plies is an asymmetric filter medium having an asymmetry factor of at least 1.5,
the n plies have an overall asymmetry factor of at least 10, a pore size of the n plies substantially continuously decreases in a thickness direction of the serial arrangement, and wherein the arrangement is an assembly composed of n plies of asymmetric filter media which are loosely stacked on top of one another and are, in an edge region of the plies, embedded in a filter housing.

2. The serial arrangement as claimed in claim 1, wherein each of the n plies is a microporous membrane.

3. The serial arrangement as claimed in claim 1, the serial arrangement having a thickness of 100 to 1000 µm.

4. The serial arrangement as claimed in claim 1, wherein the pore size of the n plies decreases linearly, concavely or convexly in the thickness direction.

5. The serial arrangement as claimed in claim 1, wherein a thickness of the plies is, independently of one another, 50 to 250 µm.

6. The serial arrangement as claimed in claim 1, wherein the plies are constructed from PVDF, PTFE, cellulose ester, cellulose hydrate, polyamide, polysulfone, polyarylsulfone, polyacrylic acid, polymethacrylic acid, acrylic acid-methacrylic acid copolymer, polyethersulfone or a mixture thereof.

7. The serial arrangement as claimed in claim 1 configured for filtration of viruses and/or for filtration of mycoplasmas.

8. The serial arrangement as claimed in claim 1, comprising plies.

9. The serial arrangement as claimed in claim 1, the serial arrangement having a thickness of 150 to 600 µm.

10. The serial arrangement as claimed in claim 1, wherein a thickness of the plies is, independently of one another, 100 to 200 µm.

11. The serial arrangement as claimed in claim 1, wherein the plies are constructed from polyethersulfone.

12. A filtration unit comprising a serial arrangement as claimed in claim 1, wherein the filtration unit is a cassette, a plate module, a hollow-fiber module, a pleated cartridge or a capsule.

13. The serial arrangement as claimed in claim 12, wherein the n plies of the serial arrangement each have a radiation resistance of 20-500 kGy such that the filtration unit is sterilizable with gamma radiation for sterile-filtration.

* * * * *